United States Patent [19]

Hirsch et al.

[11] 4,192,851

[45] Mar. 11, 1980

[54] LEACHING OF METAL SULPHIDES

[75] Inventors: Horst E. Hirsch; John F. Higginson, both of Trail; Ernest G. Parker; Godefridus M. Swinkels, both of Rossland, all of Canada

[73] Assignee: Sherritt Gordon Mines Limited, Toronto, Canada

[21] Appl. No.: 886,368

[22] Filed: Mar. 14, 1978

[30] Foreign Application Priority Data

Mar. 15, 1977 [GB] United Kingdom ............... 10800/77

[51] Int. Cl.$^2$ ......................... C01G 3/10; C01G 9/06; C01G 1/00
[52] U.S. Cl. ......................................... 423/28; 423/1; 423/26; 423/27; 423/41; 423/109; 423/110; 423/571; 423/567 A; 423/22; 423/87; 423/53; 423/98
[58] Field of Search .................... 423/1, 26, 47, 27, 41, 423/109, 110, 567 A, 578 A, 578 R, 658.5, 571, 27, 28; 23/367 S, 308 S; 75/101 R

[56] References Cited

U.S. PATENT DOCUMENTS

| | | | |
|---|---|---|---|
| 1,457,793 | 6/1923 | Perry et al. | 23/308 S |
| 1,763,762 | 6/1930 | Crowley | 23/308 S |
| 1,990,602 | 2/1935 | Guernsey | 23/267 S |
| 2,253,566 | 8/1941 | Klepetko | 23/267 S |
| 3,867,268 | 2/1975 | Kawulko et al. | 423/109 |

*Primary Examiner*—Herbert T. Carter
*Attorney, Agent, or Firm*—Arne I. Fors; Robert F. Delbridge

[57] ABSTRACT

The process of the invention is for the separate recovery of elemental sulfur and residual sulfides and metal salt solution from reaction slurries obtained from leaching of metal sulfides in ores and concentrates. The process comprises directing flow of a said reaction slurry at a temperature at which sulfur is present in the liquid state and at a pressure such that flashing of vapor is avoided into a separating step comprising a substantially quiescent zone, coalescing said elemental sulfur in the substantially quiescent zone, settling coalesced sulfur together with unreacted sulfides from said quiescent zone, maintaining a velocity in said flow in said substantially quiescent zone to cause separation of said slurry into a first and a second fraction, said velocity having an upward velocity component, said first fraction containing dissolved metals and at least one material chosen from gangue materials and precipitated compounds, said at least one material having a terminal settling velocity less than said upward velocity component, and said second fraction containing coalesced liquid elemental sulfur and unreacted sulfides, and separately discharging said first and second fractions from said separating step.

4 Claims, No Drawings

LEACHING OF METAL SULPHIDES

BACKGROUND OF THE INVENTION

This invention relates to leaching of metal sulfides and, more particularly, relates to a method for separating the components of the reaction slurry obtained from leaching of metal sulfides and, still more particularly, relates to a process for the separate recovery of elemental sulfur and residual sulfides and metal salt solution from reaction slurries obtained from leaching of metal sulfides.

It is well known to extract metals from metal sulfides contained in concentrates and ores by reacting the sulfides with such lixiviants as ferric chloride, ferric sulfate, sulfuric acid, hydrochloric acid or nitric acid, often in combinations with oxidizing substances such as air, oxygen, hydrogen peroxide or chlorine whereby metals are dissolved with concurrent oxidation of sulfide sulfur to elemental sulfur. Depending on the lixiviant and the conditions under which the extraction is carried out, certain metals are leached from the sulfides, while other metals are only partly leached or remain unattacked. It is also known that certain metals that are extracted from sulfides may form insoluble compounds. Concentrates or ores invariably contain gangue materials which may be partly dissolved in the extraction or remain unattacked. The extraction of metals from sulfides by leaching with a suitable lixiviant, therefore, generally results in the formation of a leach slurry or reaction slurry which contains dissolved metal, elemental sulfur, unleached sulfides, gangue materials and precipitated compounds.

The separation of the components of the reaction slurry is difficult to achieve. In many cases, unleached sulfides are occluded in elemental sulfur. The elemental sulfur may be present in very finely divided form and any compounds that are precipitated during the extraction are also usually present in very finely divided form. In addition, when the extraction is carried out above the melting point of sulfur, the discharge and the pressure release of the reaction slurry can create problems which may result in the formation of solid sulfur in the amorphous form which is often sticky and difficult to handle.

In conventional treatment of leach reaction slurries, the reaction slurry is normally separated into solids and liquid fractions, usually by thickening, settling or filtration. The solids fraction may be separately treated by flotation to separate unreacted sulfides and elemental sulfur from other solid materials. The flotation concentrate, which contains unreacted sulfides and elemental sulfur, may be further treated by one or a combination of a number of methods to separate unreacted sulfides from elemental sulfur, such as, for example, by pelletization, hot filtration, solvent extraction, or volatilization of the sulfur. Alternatively, the solids fraction may be subjected to a pelletizing operation whereby pellets of sulfur are formed. The sulfur pellets, which may contain occluded sulfides, are separated, melted and the melt is filtered to remove sulfides for recovery of the elemental sulfur.

Solutions obtained from the liquid-solid separation are usually clarified and then subjected to further treatment resulting in the recovery of the desired metals. The conventional treatment of the reaction slurry thus involves many operations, which result in losses and inefficiencies.

It has now been found that the treatment of the reaction slurry obtained from the extraction of metals from metal sulfide ores and concentrates can be much simplified whereby some of the conventionally used process steps are eliminated and whereby losses and inefficiencies are reduced. Thus, the present invention provides a process for the efficient separate recovery of elemental sulfur and dissolved metal from unreacted sulfides, gangue materials and precipitated compounds.

SUMMARY OF THE INVENTION

Accordingly, there is provided in a process for extracting metals from ores and concentrates containing metal sulfides and for separate recovery of elemental sulfur which comprises leaching said ores and concentrates with lixiviant capable of dissolving metals with concurrent oxidation of sulfide sulfur to elemental sulfur, said leaching resulting in the formation of a reaction slurry comprising dissolved metals, elemental sulfur and unreacted sulfides and at least one material chosen from the group consisting of gangue materials and precipitated compounds, the improvement which comprises directing a flow of said reaction slurry at a temperature at which sulfur is present in the liquid state and at a pressure such that flashing of vapour is avoided into a separating step comprising a substantially quiescent zone, coalescing said elemental sulfur in the substantially quiescent zone, settling coalesced sulfur together with unreacted sulfides from said quiescent zone, maintaining a velocity in said flow in said substantially quiescent zone to cause separation of said slurry into a first and a second fraction, said velocity having an upward velocity component, said first fraction containing dissolved metals and at least one material chosen from gangue materials and precipitated compounds, said at least one material having a terminal settling velocity less than said upward velocity component, and said second fraction containing coalesced liquid elemental sulfur and unreacted sulfides, and separately discharging said first and second fractions from said separating step.

DESCRIPTION OF THE PREFERRED EMBODIMENT

The method of the invention will now be described in detail. Starting materials are subjected to a leaching step wherein the materials are reacted with lixiviant capable of dissolving metals from contained metal sulfides with concurrent oxidation of sulfide sulfur to elemental sulfur.

Metal sulfide containing starting materials may be high and low-grade materials such as ores and concentrates containing simple or complex metal sulfides which may comprise such minerals as, for example, sphalerite, wurtzite, galena, marmatite, pyrite, pyrrhotite, chalcopyrite, covellite, chalcocite, cubanite, digenite, bornite, millerite, pentlandite, violarite, heazlewoodite, polydymite, siegenite, and may further contain such metals as antimony, arsenic, bismuth, indium, cadmium, tin, selenium, tellurium, molybdenum, silver and gold.

Starting materials are preferably in a finely divided particulate form. Particle sizes of starting materials may, for example, be within the size range used in flotation of ores such that usually at least 80% of the particles are smaller than 74$\mu$. However, in order to realize substantially complete extraction of desired metals in the leach, the particle size range would preferably be smaller such that at least 90% of the particles are smaller than 44μ, while in some cases it is preferable that at least 98% of the particles are smaller than 44μ. If desired, starting materials may be reduced in size according to conventional practice.

Prior to subjecting starting materials to leaching, the materials may be subjected to an activation step, if desired, to make the materials amenable to leaching. Activation may be accomplished by subjecting starting materials to heat treatment under oxidizing, reducing or neutral conditions, or combinations thereof. Alternatively, activation may be accomplished by subjected the materials to a wet activation whereby at least some of the complex metal sulfide minerals are converted into simple metal sulfides. A combination of thermal and wet activations may also be used.

The lixiviant may be one of a large number of lixiviants conventionally used to extract metals from sulfides with concurrent oxidation of sulfide sulfur to elemental sulfur, such as ferric chloride; ferric chloride and one or more metal chlorides; ferric sulfate; dilute nitric acid; sulfuric acid and oxygen, air or hydrogen peroxide; acidic cupric chloride; ferrous chloride and chlorine; hydrogen chloride and chlorine; and chlorine and water.

Starting materials, after size reduction and/or activation, if desired, are usually slurried with lixiviant and the slurry is agitated for a time sufficient to effect dissolution of metals as metal salts. The leaching step is generally carried out at temperatures in the range of from ambient temperatures to about 175° C. Above about 175° C., elemental sulfur is oxidized to sulfate sulfur which is generally undesirable. The leaching step may be carried out at atmospheric or super-atmospheric pressures. For example, the leaching step may be carried out at (a) temperatures in the range of ambient to the boiling point of the slurry at atmospheric pressure, (b) temperatures in the range of 70° C. to 110° C. under pressures in the range of atmospheric to 3000 kPa, or (c) temperatures in the range of 110° to 175° C. under pressures in the range of atmospheric to 3000 kPa. Pressures may include partial pressures of an oxygen-bearing gas, such as air or oxygen, in the range of from slightly above atmospheric pressure to 1500 kPa. The temperature under (a) and (b) are below the melting temperature range of sulfur and those under (c) are approximately at and above the melting temperature range of sulfur.

In general, the lixiviant or combinations of lixiviants and the leaching conditions are chosen with regard to the composition of the starting material, the desired metal values, the wetting of particulates by liquid sulfur or occlusion of particulates in sulfur and the formation of precipitates.

The leaching step may be conducted in one or more stages each under different or the same conditions and may be conducted in one or more vessels, which may contain one or more compartments. The leaching step may be conducted according to the co-current flow, counter-current flow, or cross-flow principles.

Upon completion of the leaching step, a reaction slurry is obtained which contains dissolved metals as metal salts, elemental sulfur, unreacted sulfides, and gangue materials, as well as, in many cases, one or more precipitated compounds. The reaction slurry is subjected to a settling-separating or decanting step, hereinafter called the separating step.

In the separating step, a flow of reaction slurry is established in a substantially quiescent zone, i.e. one in which undesirable turbulence is avoided, at a temperature at which sulfur is present in the liquid state.

The constituents of the reaction slurry at a temperature at which sulfur is present in the liquid state have varying physical characteristics. Elemental sulfur has several allotropic forms and liquid sulfur has wetting characteristics for certain solids, and has a specific gravity or density and a viscosity that vary with temperature. The viscosity of liquid sulfur reaches a minimum at a temperature in the range of 157° to 160° C. and increases rapidly above this temperature. It is noted that super cooling of liquid sulfur may occur at temperatures well below the melting temperature range of 110° to 119° C. at atmospheric pressure. Dissolved metal salts are present in an aqueous solution. Unreacted sulfides are present in finely divided solid form, but not larger and probably not much smaller than the particle sizes at which the sulfides were subjected to the leaching step; a major portion of the unreacted sulfides may be occluded in liquid sulfur because of at least partial wetting of sulfide particles by liquid sulfur, while the remaining portion may not be wetted. Precipitated compounds, if formed, are present as extremely fine solids or slimes having particle sizes substantially smaller than those of the unreacted sulfides and specific gravities which may be similar to or substantially different from those of the unreacted sulfides; most precipitated compounds are normally not wetted by liquid sulfur. Gangue materials are present as finely divided solids which are similar in size to unreacted sulfides and which are normally not wetted by liquid sulfur.

It has been found that when reaction slurry is fed to a separating step and when a flow of reaction slurry is established in a substantially quiescent zone of the separating step, liquid sulfur coalesces and subsequently settles rapidly from the quiescent zone together with most of the unreacted sulfides as a phase separate from the aqueous phase containing dissolved metals. It has also been found that when a certain flow velocity having an upward component is maintained in the flow of slurry through the separating step, gangue materials and precipitated compounds can be separated from the liquid sulfur and unreacted sulfides, and can be removed with the aqueous phase. Thus, in general, a first fraction can be obtained in the separating step which contains dissolved metal salts in aqueous solution and solid materials not wetted by liquid sulfur and fine enough in size to be carried over in the solution, and a second fraction can be obtained which contains liquid sulfur, solid materials wetted by liquid sulfur, and those materials too coarse and/or too heavy to be carried over with the first fraction. More specifically, it has been found that by flowing the reaction slurry, at a slurry temperature at which sulfur is present in the liquid state, through the separating step with a certain velocity of which the value of the upward flow velocity component is greater than the terminal settling velocity of gangue materials and precipitated compounds, dissolved metal salts in aqueous solution and any precipitated compounds and gangue materials will form the first fraction, and that this first fraction can be separated from liquid sulfur and most of the unreacted sulfides which will form the second fraction by coalescence of liquid sulfur and settling of coalesced liquid sulfur together with unreacted sulfides from the substantially quiescent zone.

It is essential that the reaction slurry is at a temperature at which sulfur is present in the liquid or molten state. The process of the invention is most advantageously applied in leaching processes in which the temperature is above the melting point of sulfur. If the leaching step is carried out below the temperature range at which sulfur is present in the liquid state, the reaction slurry is heated at least to a temperature at which sulfur will be present in the liquid state, while if the leaching step is carried out at a temperature above the melting point of sulfur, the reaction slurry is maintained at a temperature at which sulfur is present in the liquid state. Heating of the reaction slurry may be done during or after the leaching step. Thus, heating may be done in a vessel or container which is part of the leaching step, such as, for example, in the last stage or last vessel of a multiple-stage leaching step or in the last compartment of a multiple-compartment leaching vessel, or may be carried out in a separate vessel; conventional means for heating are used. The temperature of the reaction slurry being subjected to separation must be at a temperature at which sulfur is present in the liquid state and is, preferably, in the range of 110° to 160° C., and most preferably in the range of 120° to 150° C. The temperature range of 110° to 119° C. is usually considered the melting temperature range of the various allotropic forms of elemental sulfur, i.e. those temperatures at which solid and liquid sulfur co-exist. Due to the characteristic of super-cooling of liquid sulfur, it may be possible to have liquid sulfur at temperatures well below the range of 110° to 119° C. The temperature range of 157° to 160° C. includes the point from which the viscosity of liquid sulfur increases with increasing temperature almost asymptotically from a minimum value, which is considered to be at a temperature of about 158.5° C.

The pressure in the separating step should be such that flashing of vapours is avoided. The separating step may be carried out at the approximate pressures at which the leaching step is carried out while allowing for any pressure required to attain the required velocity of the flow of reaction slurry in the separating step. The pressure may range from about the vapour pressure of the reaction slurry at the temperature at which sulfur is present in the liquid state to about 3000 kPa.

The upward component of flow velocity of the reaction slurry flow through the quiescent zone of the separating step is an important variable. The upward velocity component is dependent on the physical characteristics of the reaction slurry. If the slurry contains lighter or more finely divided material, the upward velocity component can be lower than if the slurry contains heavier or less finely divided material. If upward velocity components are too low, for example, at least some of the relatively heavier, precipitated compounds will tend to settle and, consequently, contaminate the second fraction. If upward velocity components are too high, undesired turbulence may occur and an undesirably large portion of unreacted sulfides as well as elemental sulfur may be separated with the first fraction. Thus, the upward velocity component depends mostly on the settling characteristics of the solids. To substantially separate the reaction slurry into the desired fractions, the value of the upward component of the velocity with which the reaction slurry flows through the quiescent zone should be greater than the terminal settling velocity of gangue materials and precipitated compounds. The flow velocity should not be so great as to create undesirable turbulence and to interfere with the coalescing of sulfur and the settling of the second fraction. Other factors that may affect the velocity are the density, temperature and viscosity of the slurry and its components and the concentrations of sulfur and solids in the slurry. Other factors that may affect the coalescence of sulfur and subsequent settling of sulfur and unreacted sulfides are the surface tension of liquid sulfur and the presence of surfactants.

It has been found that in treating, for example, finely divided copper- or zinc-sulfide-containing concentrates or materials having particle sizes such that at least 90% is smaller than 44μ, by leaching in sulfuric acid-containing solution at a temperature in the range of about 120° to 158° C. and at a partial pressure of oxygen in the range of from slightly above atmospheric pressure to 1500 kPa, the flow of the reaction slurry in the separating step should have a value of the upward component of the velocity in the range of 1 to 100 cm/min, preferably 5 to 50 cm/min.

The separating step is carried out in suitable separating means which contains a substantially quiescent zone. Suitable separating means may be the last stage or the last vessel of a multiple-stage or multiple-vessel leaching step, in the last compartment of a multiple-compartment leaching vessel of the leaching step, or in a separate vessel. The separating step is preferably carried out in a separate vessel of suitable configuration and construction which may, for example, be of cylindrical shape with dished, flat, conical or rounded ends, or a combination thereof, having an inlet for reaction slurry, an outlet for first fraction in the higher or top portion and an outlet for second fraction in the lower or bottom portion of the vessel. The inlet may be located between the top and the bottom of the vessel in radial or tangential fashion, or centrally in one of the ends of the vessel extending into the substantially quiescent zone in the vessel. Suitable means are provided to ensure adequate distribution of flow over the cross-section of the separating means. Heating means may be provided for raising the temperature to or maintaining the temperature at a value at which sulfur is present in the liquid state.

Reaction slurry is continuously fed into the quiescent zone of the separating means in a manner such that the flow of slurry assumes a direction that allows for coalescence of sulfur and settling of coalesced sulfur and unreacted sulfides from the quiescent zone, and for accumulation of the second fraction in the lower portion of the separating means. Thus, the direction of the flow may be horizontal, vertical or at an angle in between horizontal and vertical provided the conditions of not creating undesirable turbulence and not interfering with coalescence of sulfur and settling of second fraction described hereinabove are met. The second fraction is removed from the lower or bottom portion of the separating means in a continuous or intermittent fashion, preferably in a continuous fashion. The first fraction is removed from the higher or top portion of the separating means as an overflow in a continuous or intermittent fashion, preferably in a continuous fashion.

Stirring, which may be used to improve the separation, is preferably applied in a gentle manner to the settling and settled second fraction in the quiescent zone and the lower portion of the separating means using an agitator at low speed. This low speed stirring assists in the coalescense of liquid sulfur and removes or strips first fraction and any compounds unwetted by sulfur, such as gangue materials and precipitated compounds, from the second fraction and transfers them to the first fraction. The actual rotation speed depends on the size and the geometry of the separating means and the type of agitator. For example, rotation speeds for the agitator may be in the range of 1 to 150 revolutions per minute (rpm). The peripheral velocity of the agitator to obtain the desired effect is in the range of 5 to 150 cm/sec.

Upon removal from the separating means, the pressure on the first fraction is released, such as by flashing in one or more stages, whereby the fraction is cooled to a temperature below the boiling point of the solution at atmospheric pressure at which any sulfur present in the first fraction will be in the solid form. The cooled first fraction may then be subjected, after allowing any amorphous sulfur to convert to the nonclinic form, to filtration or other conventional operation for solids-liquid separation. Precipitated compounds and gangue materials are readily filterable and any small amount of elemental sulfur which may have been carried over with the first fraction is easily separable. Alternatively, the first fraction, after pressure release, may be subjected to flotation to remove sulfur that may be present, and the solution and contained solids may be filtered. The solution containing dissolved metal salts may subsequently be subjected to purification followed by recovery of metal according to any one of a number of established methods.

The second fraction, upon removal from the separating step, may be directly subjected to hot-filtration yielding a filtercake of unreacted sulfides and a filtrate of liquid sulfur. Unreacted sulfides may all or in part be recycled to the leaching step or may be treated for the recovery of values in separate processes. Liquid sulfur may be converted into solid sulfur of suitable shapes or sizes, or into useful sulfur compounds.

The invention will now be illustrated by means of the following example.

EXAMPLE

A concentrate containing 48.8% Zn, 5.8% Pb, 10.5% Fe, 32.5% S, 0.2% CaO, 1.7% $SiO_2$ and minor amounts of silver, gold, copper, arsenic, antimony, bismuth, cadmium and tin was leached in an agitated, four compartment, lead- and brick-lined, steel autoclave. The concentrate was reground such that 98% was smaller than 44μ and continuously fed into the first compartment of the autoclave at a rate of 85 kg/hour. Zinc plant return acid containing 165 g/l $H_2SO_4$ was preheated to 70° C. and fed continuously to the first compartment at a rate of 700 l/hour. Oxygen was supplied to the gas phase in the fourth compartment of the autoclave and a small gas bleed was taken from the first compartment to remove inert gases. Ammonium lignin sulfonate was added to the leach in an amount of 0.1 g/l of total autoclave feed. The total autoclave pressure was maintained at 1130 kPa consisting of 480 kPa steam pressure and 650 kPa oxygen pressure. The continuous retention time of the slurry in the autoclave was 90 minutes. The temperature in the first compartment was 146° C., in the second 154° C., in the third 152° C. and in the fourth compartment 146° C. Reaction slurry was continuously discharged from the autoclave and fed to a separation vessel. Zinc sulfide reacted to form zinc sulfate and elemental sulfur, iron sulfide to ferrous and subsequently to ferric sulfate and sulfur, and lead sulfide to sulfur and lead sulfate, which reacted with ferric sulfate to form complex solid plumbojarosite. The solution of the discharged reaction slurry contained 120 g/l zinc, 5 g/l iron and 25 g/l sulfuric acid. Zinc extraction was 97%.

The separation vessel consisted of a conically bottomed, vertical, stainless steel tube 0.38 m in diameter and 3 m high. A central shaft, driven by a variable speed motor, was used to mount an agitator in the lower portion of the vessel. A radial slurry inlet was positioned 0.75 m from the bottom of the vessel, an outlet for first fraction was located near the top of the vessel and an outlet for second fraction was mounted in the conical bottom. The vessel was operated at the same temperature and pressure as the leach autoclave. First fraction was continuously discharged and second fraction was discharged at hourly intervals from the vessel. The upward velocity component of the flow of reaction slurry through the separation vessel was 11 cm/min. Second fraction accumulated in the bottom portion of the vessel and was stirred with a vertical, rake-type impeller rotating at 60 rpm. The composition of the second fraction was 95.4% S°, 1.5% Zn, 0.6% Fe and 0.1% Pb.

The separated second fraction was directly subjected to hot-filtration in a pressure filter. The products were clean, yellow sulfur and filtercake containing unreacted sulfides. The sulfur was analyzed and found to contain 99.9+% S°, 0.0035% Zn, 0.01% Fe and 0.002% Pb. The filtercake contained 29.2% S, 25.0% Zn, 8.5% Fe and 1.3% Pb.

The pressure on the first fraction discharged from the separation vessel was released into a stainless steel flash tank through a stainless steel choke inserted in the flash tank. The first fraction overflowed from the flash tank into an agitated container, to allow any sulfur to convert to the monoclinic form, and was subsequently submitted to flotation. The flotation equipment consisted of four 30 l flotation cells. The first cell was used to produce a rougher concentrate of sulfur and unreacted sulfides. The three remaining cells were employed as scavenging cells on the rougher tailings with the scavenging concentrate being returned to the rougher feed. Retention time in the rougher cell was 2.2 min. and in the scavenger 6.7 min. The feed rate to the flotation was 12.7 l/min. solution and 0.76 kg/min solids, assaying 2.1% Zn, 23.7% Fe, 16.7% Pb, 7.0% S°, and 17.8% $S_T$. 99% of the S° reported in the rougher concentrate which was recovered at a rate of 0.6 kg/min of solids assaying 0.6% Zn, 1.7% Fe, 1.5% Pb, 85% S°, and 86.6% $S_T$. 99% of the lead and iron reported in the scavenger tailings, which discharged at the rate of 0.70 kg/min of solids assaying 2.3% Zn, 25.8% Fe, 18.1% Pb, 0.07% S°, and 12.2% $S_T$.

The flotation tailings were thickened to remove the solid residue and clarified zinc sulfate-containing overflow was recovered for further processing for the recovery of zinc.

What we claim as new and desire to protect by Letters Patent of the United States is:

1. In a process for extracting metals from ores and concentrates containing metal sulfides and for separate recovery of elemental sulfur which comprises leaching said ores and concentrates with lixiviant capable of dissolving metals with concurrent oxidation of sulfide sulfur to elemental sulfur at a temperature in the range of from ambient to 175° C., said leaching resulting in the formation of a reaction slurry comprising dissolved metals, elemental sulfur and unreacted sulfides and at least one material chosen from the group consisting of gangue materials and precipitated compounds, and separating molten sulfur and unreacted sulfides from dissolved metals and said at least one material chosen from gangue materials and precipitated compounds, the improvement which comprises continuously directing a flow of said reaction slurry containing solids of which at least 80% has particle sizes smaller than 74μ at a temperature at which sulfur is present in the liquid state in the range of about 110° to 160° C. and at a pressure in the range of from the vapour pressure of the reaction mixture at the temperature at which S is present in the liquid state to 3000 kPa such that flashing of vapour is avoided into a separating step comprising a relatively quiescent zone free of turbulence; coalescing said elemental sulfur in the relatively quiescent zone; settling coalesced sulfur together with unreacted sulfides from said quiescent zone; maintaining a velocity in said flow in said relatively quiescent zone to cause separation of said slurry into a first and a second fraction, said velocity having an upward velocity component in the range of 1 to 100 cm/min., said first fraction containing dissolved metals and at least one material chosen from gangue materials and precipitated compounds, said at least one material having a terminal settling velocity less than said upward velocity component, and said second fraction containing coalesced liquid elemental sulfur and unreacted sulfides; stirring said coalescing elemental sulfur, settled coalesced sulfur and unreacted sulfides at a rotational speed in the range of 1 to 150 rpm and at a peripheral velocity in the range of 5 to 150 cm/sec.; separately discharging said first and second fractions from said separating step; flashing the discharged first fraction in one or more stages; recovering solution containing dissolved metal; and subjecting the discharged second fraction to hot filtration to yield a filtercake of unreacted sulfides and a filtrate of liquid sulfur.

2. A process as claimed in claim 1, in which said reaction slurry is directed into the relatively quiescent zone at a temperature in the range of 120° to 150° C.

3. A process as claimed in claim 1 for the treating of finely divided copper- or zinc-sulfide-containing concentrates or materials, in which the upward velocity component in said flow is maintained in the range of 5 to 50 cm/min.

4. A process as claimed in claim 1, in which zinc sulfide-containing concentrate having particle sizes such that at least 90% of the particles has a size smaller than 44μ is continuously leached in sulfuric acid-containing solution at a temperature in the range of 120° to 158° C. and at a partial pressure of oxygen in the range of from slightly above atmospheric pressure to 1500 kPa, the reaction slurry is continuously separated into first and second fractions, at a temperature maintained in the range of 120° to 150° C., the upward velocity component is maintained in the range of 5 to 50 cm/min, second fraction is stirred with a rake-type impeller rotating at a rotational speed of 1 to 150 rpm and at a peripheral velocity in the range of 5 to 150 cm/sec, second fraction is continuously discharged, discharged second fraction is subjected to hot filtration, elemental sulfur and unreacted sulfides are separately recovered, first fraction is continuously discharged, discharged first fraction is flashed, flashed first fraction is submitted to flotation, and zinc sulfate-containing solution is recovered.

* * * * *